United States Patent
Holmes (10) Patent No.: US 12,223,843 B2
(45) Date of Patent: Feb. 11, 2025

(54) APPARATUS, METHOD AND SYSTEM FOR PROVIDING EVALUATION AND/OR OPTIMIZATION OF TRAJECTORY MANAGEMENT SERVICES

(71) Applicant: SMARTSKY NETWORKS LLC, Morrisville, NC (US)

(72) Inventor: Bruce J. Holmes, Williamsburg, VA (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 269 days.

(21) Appl. No.: 17/637,162

(22) PCT Filed: Aug. 26, 2020

(86) PCT No.: PCT/US2020/047909
§ 371 (c)(1),
(2) Date: Feb. 22, 2022

(87) PCT Pub. No.: WO2021/041484
PCT Pub. Date: Mar. 4, 2021

(65) Prior Publication Data
US 2022/0358845 A1    Nov. 10, 2022

Related U.S. Application Data (60) Provisional application No. 62/891,613, filed on Aug. 26, 2019.

(51) Int. Cl.
*G08G 5/00* (2006.01)
(52) U.S. Cl.
CPC ......... *G08G 5/0021* (2013.01); *G08G 5/0013* (2013.01); *G08G 5/0039* (2013.01); *G08G 5/006* (2013.01)

(58) Field of Classification Search
CPC .. G08G 5/0021; G08G 5/0013; G08G 5/0039; G08G 5/006
See application file for complete search history.

(56) References Cited

U.S. PATENT DOCUMENTS 8,660,716 B1 * 2/2014 Rahmes ................ G01C 23/00
701/4
9,269,205 B1 * 2/2016 Lamkin ................ G07C 5/0825
(Continued)

FOREIGN PATENT DOCUMENTS

EP        3211621 A1      8/2017
WO  WO-2018071377 A1 *  4/2018  ............ G01C 23/00

OTHER PUBLICATIONS

International Search Report and Written Opinion from International Application No. PCT/US2020/047909 mailed Nov. 20, 2020, all pages cited in its entirety.

*Primary Examiner* — Khoi H Tran
*Assistant Examiner* — Dairon Estevez
(74) *Attorney, Agent, or Firm* — Burr & Forman LLP (57) ABSTRACT

An aviation advisory module may include processing circuitry configured to receive data indicative of internal factors and external factors related to route optimization of an aircraft. At least some of the external factors may include dynamic parameters that are changeable while the aircraft is in-flight. The processing circuitry may also be configured to generate a guidance output associated with a route of the aircraft based on integration of the internal factors and the external factors to optimize the route for a user-selected cost parameter, and provide a graphical representation of the guidance output along with comparative data or context information associated with the user-selected cost parameter.

15 Claims, 6 Drawing Sheets

(56) References Cited

U.S. PATENT DOCUMENTS

| | | | |
|---|---|---|---|
| 9,443,434 B2 | 9/2016 | Hale et al. | |
| 2004/0083126 A1* | 4/2004 | Svenson | G06Q 30/0202 |
| | | | 705/7.31 |
| 2008/0201183 A1* | 8/2008 | Jha | G06Q 10/06316 |
| | | | 701/120 |
| 2014/0257925 A1* | 9/2014 | Tracy | G06Q 30/0202 |
| | | | 705/7.31 |
| 2015/0279218 A1* | 10/2015 | Irrgang | G07C 5/0816 |
| | | | 701/3 |
| 2016/0019795 A1* | 1/2016 | Chircop | G08G 5/0078 |
| | | | 701/3 |

* cited by examiner

APPARATUS, METHOD AND SYSTEM FOR PROVIDING EVALUATION AND/OR OPTIMIZATION OF TRAJECTORY MANAGEMENT SERVICES

CROSS REFERENCE TO RELATED APPLICATIONS

This application claims priority to U.S. application No. 62/891,613 filed Aug. 26, 2019, the entire contents of which are hereby incorporated by reference in its entirety.

TECHNICAL FIELD

Example embodiments generally relate to the aviation industry and, more particularly, relate to the ability to provide comparative economic and technical evaluations of routes associated with in-flight aircraft.

BACKGROUND

The market for mobile device-based applications is currently populated with a large number of products that provide pilots with improved means for traditional flight planning (e.g., ForeFlight, Garmin Pilot, Jeppesen TC, JeppVFR, WingXPro, Fly!, My Wingman, ARINC Direct, AeroVie, Xavion, RocketRoute, iFlightPlanner, FltPlan.com, and others). These products perform a useful function in improving the traditional, largely manual means of planning flights through electronic applications (apps) on both mobile devices and in flight deck forward field of view displays. These apps streamline the pre-flight planning process through simplified access to integrated forms of weather, airspace, and aircraft data, as well as through automating calculations formerly requiring manual processing.

However, even though each of these products uses various different pieces of information to improve route planning capabilities, and some can even purport to generate "optimized" routing services for some parameters, the products generally do not enable continuous or periodic updating of flights in real time. Moreover, these products also generally do not provide any means by which to evaluate a degree of optimization offered by the service, or the impact of optimization of one parameter relative to the costs imposed by such optimization on other parameters. As such, not only do the products leave much to be desired in terms of real-time integration of data to account for dynamically changing airspace constraints and traffic flows, but they also leave the optimization of flight trajectory objectives as a faith-based exercise that a pilot must accept without any proof or context to enable full appreciation of the actual value of the optimization that is purported to be provided.

BRIEF SUMMARY OF SOME EXAMPLES

Some example embodiments may therefore be provided to overcome some of the limitations described above within the context of a system that provides improved connectivity to support real-time, optimal management of flight paths in the context of various objective (or "cost") parameters. In this regard, for example, some embodiments may provide "proof points" for the evaluation of optimized flight paths.

In one example embodiment, an aviation advisory module is provided. The module may include processing circuitry configured to receive data indicative of internal factors and external factors related to route optimization of an aircraft. At least some of the external factors may include dynamic parameters that are changeable while the aircraft is in-flight. The processing circuitry may also be configured to generate a guidance output associated with a route of the aircraft based on integration of the internal factors and the external factors to optimize the route for a user-selected cost parameter, and provide a graphical representation of the guidance output along with comparative diagnostic data or context information associated with the user-selected cost parameter.

In another example embodiment, a method for providing aviation advisories is provided. The method may include receiving data indicative of internal factors and external factors related to route optimization of an aircraft. At least some of the external factors may include dynamic parameters that are changeable while the aircraft is in-flight. The method may further include generating a guidance output associated with a route of the aircraft based on integration of the internal factors and the external factors to optimize the route for a user-selected cost parameter, and providing a graphical diagnostic representation of the guidance output along with comparative data or context information associated with the user-selected cost parameter.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received, processed and/or stored in accordance with example embodiments. Thus, use of any such terms should not be taken to limit the spirit and scope of example embodiments. As used herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

As mentioned above, the preparation of a flight plan, which includes the selection of a route will, if the route is followed, define corresponding costs in terms of consumption or generation of certain parameters or values that are likely to correspond to the route. These costs in terms of consumption or generation of parameters may include time consumption, fuel consumption, carbon generation, contrail generation, turbulence, and/or the like. Prior to beginning a flight, the likely costs associated with the flight plan can be calculated based on current conditions. Moreover, applications can be employed to suggest improvement or even optimization of a route in order to minimize or maximize any desired parameters. The suggested or optimized route may then be presented to the user for acceptance and adoption.

However, it should be understood that many so called "optimized" routes could exist between two points over time due to the potential for dynamic changing of conditions. Thus, it should be appreciated that the calculation of an optimized route is really just the calculation of a theoretical optimized route for a given instant in time based on the parameters in existence (or defined) for the route at that given instant in time. As the route progresses, and current as well as forecast conditions change, the optimization actually also very likely changes. Accordingly, real time updating of conditions and optimization options is an important enabling objective to the improvement of flight planning. However, the potential for improvement does not stop there.

As noted above, optimization calculation is currently a faith-based exercise that often lacks any context information to validate the value of the optimization suggested. In this regard, a route optimized for time typically calculates the route (again for current conditions) that would take the least time and then displays the suggested (i.e., time-optimized) route. Similarly, a route optimized for fuel consumption would typically calculate the route (as always, based on current conditions) that would generate the least fuel consumption, and display the suggested (i.e., fuel-optimized) route. In either case, the parameter-optimized route may be accepted or adopted by a pilot or a flight operations dispatcher without appreciating the degree of improvement achieved relative to other routes, much less the impact of optimizing one parameter on other parameters. Accordingly, it should be appreciated that the provision of comparative data that can provide context information on the degree of improvement or impact on cost and/or other parameters for an optimized route would be of significant value. In relation to this disclosure, that comparative data and context information may be considered to be "proof points." However, providing the capability to deliver dynamically updateable proof points using real time data during flight, that also takes into account the real time data and parameters associated with other actively unfolding flights, further increases the value of the improvements provided by example embodiments.

Example embodiments provide a system that utilizes real time connectivity to a plurality of in-flight aircraft, and real time updating of changing flight conditions to provide an in-flight service that delivers not only optimized routes, but dynamically updated optimized routes that further include evaluation information in the form of comparative data and context (or diagnostic) information to demonstrate the degree of optimization relative to other options and/or the impact of optimizing one parameter on other parameters. Thus, the real time connectivity aspect of example embodiments may be a backbone upon which other evaluation tools may be built. Accordingly, some example embodiments may implement a computer executable application or module, employed via air-to-ground, air-to-air, or satellite communication-based aircraft connectivity. The application or module may employ methods for dynamic flight path management for computing and optimizing flight paths, and for providing evaluation techniques to further provide comparative data and context information as described above. The capability disclosed herein may be implemented using trajectory optimization methods employing (for example) kinetic, kinematic, point-mass, as well as six-degree-of-freedom path models.

Within the aviation industry, the process for management of dynamically interacting flight paths may be referred to as CR5DT, translated to mean Continuous Replanning of Five-Dimensional Trajectories for continuous replanning in five dimensions. As noted above, some example embodiments may employ a "Flight 5D" application module (or Destination Certainty application module), which is configured to employ the technologies described herein, but which is further augmented with a proof points module configured to probabilistically provide evidence of the optimization (and degree thereof) of a current flight path relative to other options, or to demonstrate evidence that another route may actually be optimal relative to the current route based on some changes to the conditions that were used to calculate the current route. The probabilistically driven evaluation and comparative module (which may also be referred to as a proof points module) provides the pilot with periodically updated advisories that include context information and comparative data to demonstrate the degree of optimization relative to other options (or at least a current or reference option). The proof points module may be built onto a continuous replanning module that is configured to account for both the external and internal factors that bound the future flight path solution space, based on the ability, through a real time aviation connectivity solution, to continually ingest updated forecasts of all factors affecting all of the future of any given flight path. The approach accounts for external factors, which may include airspace exclusions, architectures and procedures; winds and temperatures aloft; storms, icing, volcanic ash and turbulence; and other air traffic, including air traffic management flow control initiatives for congestion management. Internal factors accounted for may include pilot or operator policies and preferences for desired time of arrival, avoidance of turbulence or icing or other flight hazards, fuel burn minimization, and cost minimization. Additional internal factors include current and future aircraft weight, speed, configuration of landing gear and controls, and effects on performance of abnormal conditions such as failure of an engine or other aircraft system such as cabin environmental, hydraulics, electrical, communications systems, or other factor affecting otherwise normal flight operations. Collectively, the combination of these variables and constraints create a flight path management challenge that no pilot, flight crew, or fleet manager can continually update to achieve optimal solutions for a complete flight path from origin or current position to destination, during flight. Example embodiments may enable optimization in-flight, and in a dynamic and responsive way, but may further provide the tools to assign a monetary or other demonstrable value to the optimization. Thus, the actual cost savings (in dollars, time, pollution, etc.) may be calculable using example embodiments. The assignment and visualization of an actual value in terms of various types of cost savings can be a powerful behavioral influencer. However, the assignment of such cost can also show an amount of savings that validates the value of the service and, in some cases, can be used as a basis for determining a cost (or price) for the service itself (e.g., by making the cost/price of the service related to the cost savings provided by the use of the service).

Beyond just calculating optimal solutions in real time, the power of in-flight connectivity further enables example embodiments to demonstrate the degree of improvement offered by potential changes (or the current route) over other alternatives. This comparative and contextual information provision further enables fully informed decision making by the pilot, air traffic controllers, fleet managers, and/or the like. Accordingly, for example, preferences or priorities of the pilot (or others) can supersede optimization in certain instances where the pilot's judgement dictates that the optimization is not worth pursuing due to other considerations that may be known to the pilot. As an example, the pilot may be informed that conditions have developed that have made the flight path previously suggested no longer the most optimal route in terms of fuel consumption. Under normal circumstances where the pilot (or fleet manager) is concerned about managing fuel costs, the pilot may adjust the flight plan enroute in order to adopt a more optimal route for the current conditions without actually appreciating the degree to which the newly suggested route actually provides improvement. However, if the pilot (or fleet manager) was further informed that the newly suggested optimal route actually saves fuel costs by less than 1%, while increasing the time cost by 8%, the pilot (or fleet manager) may decide that the relatively small increase in fuel economy is more than offset by the large increase in cost in terms of time due to other commitments of the aircraft or the pilot. Thus, the fuel-optimized route may not be adopted in favor of the current route, which is significantly faster and only slightly less fuel efficient.

However, it should further be appreciated that such comparative data and context information, particularly across multiple parameters, can enable pilots or fleet managers to determine multivariate optimization or select routes that, although perhaps not optimal for any particular individual parameter, are nevertheless quite good at balancing a number of factors. The consequence may be that flight paths are manageable in more practical ways that reduce overall waste and inefficiencies in flight path and airspace performance on balance and across a number of important factors for an individual, group of individuals or organization. Example embodiments described herein enable solutions that can reduce pilot and dispatcher workloads and dramatically increasing fidelity and accuracy of flight path management, while simultaneously enabling informed decisions to be made relative to understanding and managing the costs of decisions being made in real time.

Example embodiments may be implemented in a variety of computing and communications architectures involving airborne and ground (cloud)-based alternatives. A proof points module could be operated as a Web service or desktop application if supplied with all the data required for the computational optimization of the flight path and a data communication link to and from the aircraft. The proof points module may be executed on any number of computing platforms, including mobile devices such as smart phones or tablet-based personal electronic devices, or in the avionics panel of an aircraft, or in devices that provide aural, tactile, or visual cues or are "wearable" by pilots. Furthermore, computations associated with flight path optimization and proof points can be effectively conducted in data centers (or the "cloud") as means of alternative architectures for generating and providing advisories to the pilot or a dispatcher, where the advisories are provided wirelessly to the aircraft while in-flight along with the context information and comparative data described herein. However, computations associated with example embodiments could also or alternatively be performed in the air. That said, given the ability for real time connectivity that is advantageously employed in connection with example embodiments, the possibility of minimizing the amount of hardware in the air may be taken advantage of to lighten the weight and cost of equipment that is airborne without sacrificing anything in terms of capability. As such, by employing cloud-based computation and real time connectivity bandwidth-enabled access to the data and information required and the means of computing the data-driven flight path advisories for the aircraft operator are provided, along with the proof points aspects described herein to validate the information provided, but also provide context that enables more informed decision making by pilots, air traffic controllers or fleet manager instead of blind adoption of suggested routing without full appreciation of the actual savings or costs associated with such adoption. Pilots, air traffic controllers and/or fleet managers may therefore be provided with continuously updated information about the best heading, speed, altitude, routing, and rate of climb/descent to fly from wherever they are in the airspace, to their primary or alternate destination, and, in addition, provides pilots with comparative data and contextual information that enables the most informed decision making possible regarding the trajectory options among which they can choose or about which they are advised.

Example embodiments may generate flight trajectory solutions using a computational platform that has sufficient speed and is fed by sufficient data to produce advisory information that is relevant in real-time and in fast-time, and may further evaluate those solutions, also in real-time and in fast-time to provide the proof points-related feedback described herein. Through the integration of a computational platform in a system that includes Air-to-Ground (ATG) 4G LTE WiFi access (for example) and/or ADS-B 978 MHz UAT FIS-B and TIS-B data (for example), example embodiments enable the generation of regular updates to flight path optimizations that satisfy user preferences and policies for path objectives, and demonstrate also the degree of optimization relative to alternative and potentially impacts across multiple factors that are candidates for optimization. An example of an ATG access system that may employ an example embodiment is described below. However, it should be appreciated that example embodiments may also employ air-to-air or satellite components in some cases, either alone or in combination with each other and ATG components.

In an ATG context, each base station is typically one of a plurality of base stations that are deployed on the ground (or in the air) to be partially overlapping with adjacent base stations to provide continuous and uninterrupted coverage over a particular geographic area. The base stations are interconnected with each other to form a network, and may also be interconnected with other networks via a backhaul network or assembly. Mobile equipment that utilizes the communication network formed by these base stations includes devices on various aircraft. Moreover, the real-time, high bandwidth connection (in both directions) that may be offered by a full duplex ATG system may provide the opportunity for a "streaming black box" that can provide all data (and more) that is normally stored on board an aircraft for safety monitoring to equipment on the ground. Additionally, real-time flight tracking, even at granular levels of data, can be accomplished ue to the high bandwidth and real-time connection.

In some examples, the ATG network may be designed to employ beamforming technology to communicate more efficiently and reliably. In this regard, for example, beams may be formed at or steered to desirable locations within a coverage area of a cell defined by a base station (or an aircraft) to extend range, reduce interference, and provide other enhanced communication capabilities. Whether the beams are steered or formed within this context, the control of the beams may be referred to as beamforming, and may be controlled by a beamforming control module. In some embodiments, the beamforming control module may be provided at mobile nodes of an air-to-ground network (e.g., aircraft), base stations of the network, and or at a network controller either at a central network location or in the cloud. The beamforming control module may utilize position information of both the base stations and the mobile nodes to determine (predictively or in real-time) where to steer beams to ensure continuous communication can be maintained both within an individual cell and when a handover to another cell is desirable.

In some embodiments, a base station employing beamforming may employ an antenna array to generate (e.g., form) or steer beams in the direction of the target device, enhancing the coverage range when the location of the device is known relative to the base station. When the location of the device is not known to the base station, then a beam may not be formed in the direction of the target device and the coverage range of the base station would effectively be reduced. To address this potential problem, it may be possible to utilize current and future position information of receiving stations and base stations to facilitate beamforming at either or both ends of the wireless communication links that are to be established.

In an ATG communications system, the end-user equipment (or receiving stations) may be installed or otherwise present on an aircraft or other aerial platform. Thus, as mentioned above, the utilization of position information may not simply involve knowledge of latitude and longitude, relative positioning, global positioning system (GPS) coordinates, and/or the like. Instead, knowledge of three dimensional (3D) position information including altitude may be required. Speed, course, and any other information descriptive of the current 3D position and likely future positions may also be helpful in some cases. When the 3D position of aircraft (or communication devices thereon) is known at a current time and in future time, this location-and time specific information may be employed by the wireless system to enhance the initial synchronization coverage range by enhancing beamforming. This 5D knowledge may also enhance the ability to track the trajectory of the aircraft and other aircraft to allow fully comprehensive communication of data in two directions to substantially enhance the quality of advisory services that react to real time internal and external factors.

In some cases, the knowledge of locations of fixed assets (i.e., base station locations) may be known in advance and, for example, may be stored at a location accessible to any or all assets of the network. Knowledge of movable device locations (e.g., aircraft) may be actively tracked for all devices (e.g., all aircraft or other known receiving devices on the aircraft) in the 3D airspace. As an example, aircraft (or devices thereon) taking off from an airport may access and synchronize with a base station near the airport. Once known to the wireless system, each device may periodically transmit position information (e.g., coordinates, altitude, and speed) to the serving base station. The base station may share the position information with a centralized server or other device in the core network, or in the cloud. The centralized server (or other processing device) may then track each device, compare the device location against a database of base stations in the system, and determine when a particular device may be moving into a different base station's coverage area. The device location may be shared with the new base station, and the new base station may then form a directional beam toward the wireless device to share synchronization information.

Example embodiments may therefore combine knowledge of fixed base stations positions with knowledge of moving receiving station positions (e.g., in 5D) to provide beamforming from both the aircraft (or devices thereon) and the base station when the device has not yet acquired a neighboring base station. Full beamforming coverage benefits may therefore be maintained within an ATG system, reducing the cost of network coverage and improving hand-off reliability. The improved gain by using directed beams may enable aircraft to engage in communications with potentially distant base stations on the ground. Accordingly, an ATG network may potentially be built with base stations that are much farther apart than the typical distance between base stations in a terrestrial network thereby increasing the cost effectiveness of the ATG service.

With the ability to communicate with aircraft (and devices thereon) via focused and high-bandwidth, low latency beams established, communication of data to and from the aircraft can be greatly enhanced. Processing capabilities provided on the aircraft, on the ground, and/or in the cloud, may therefore be similarly enhanced to provide full integration of real time data into trajectory management for continuous replanning of dynamically interacting trajectories for optimal economic and safety related outcomes. The proof points module, which may be configured to further provide context information and/or comparative data associated with optimized route planning (and presentation) may be a component of the trajectory management suite of services that are made available to network devices via a real-time intelligent system for managing assets and providing relevant information thereto while such assets are in-flight. This system may be referred to, or be a portion of, a "Skytelligence®" system.

Figure 1:
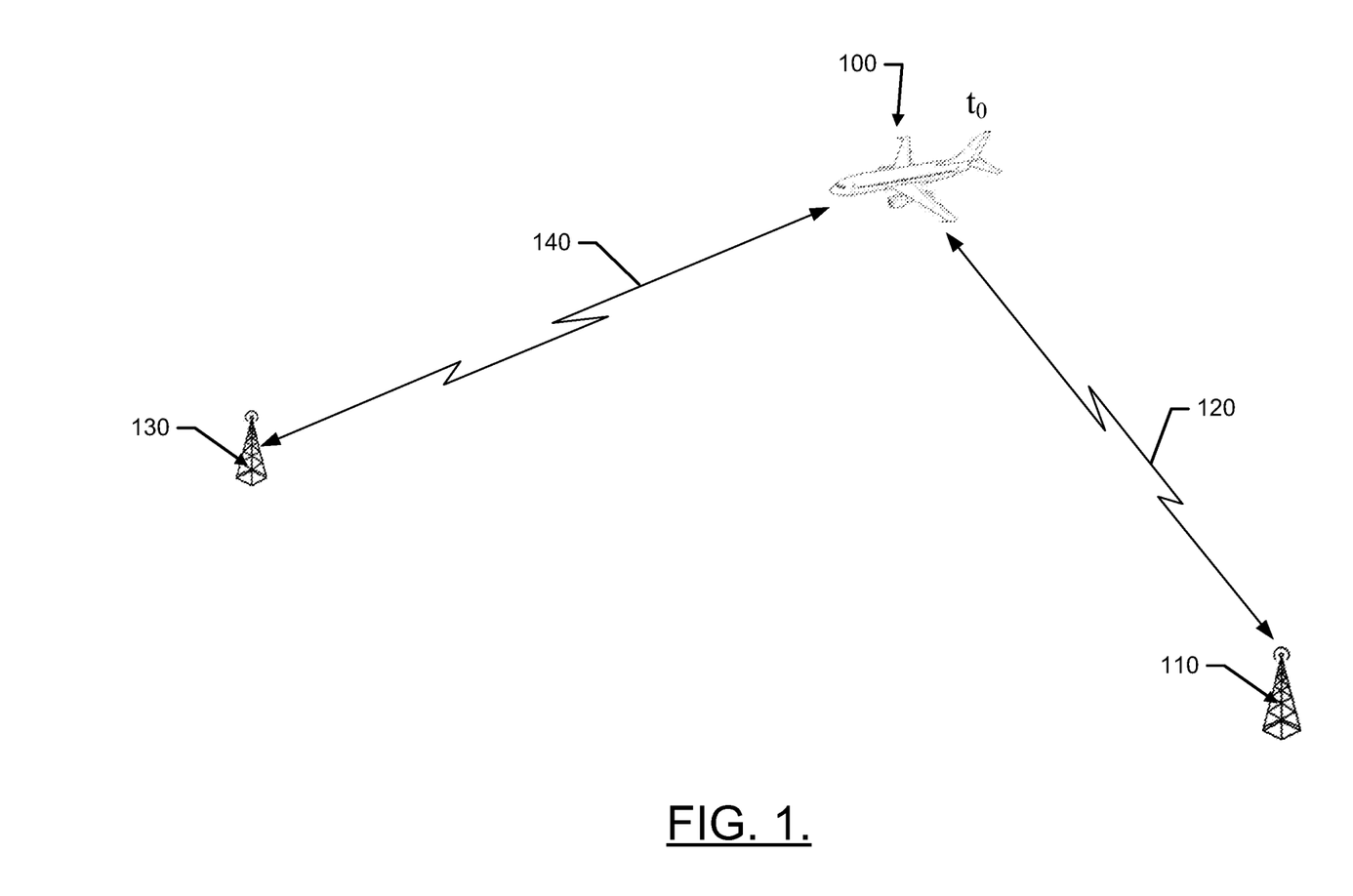
FIG. 1 illustrates an aircraft moving through the coverage areas of different base stations over time in accordance with an example embodiment.

FIG. 1 illustrates a conceptual view of an aircraft moving through a coverage zone of different base stations to illustrate the beamforming aspects that may be integrated into an example embodiment. As can be seen in FIG. 1, an aircraft 100 may be in communication with a first base station (BS) 110 at time $t_0$ via a wireless communication link 120. The aircraft 100 may therefore include wireless communication equipment onboard that enables the aircraft 100 to communicate with the first BS 110, and the first BS 110 may also include wireless communication equipment enabling communication with the aircraft 100. As will be discussed in greater detail below, the wireless communication equipment at each end may include radio hardware and/or software for processing wireless signals received at corresponding antenna arrays that are provided at each respective device in communication with their respective radios. Moreover, the wireless communication equipment of example embodiments may be configured to employ beamforming techniques to utilize directive focusing, steering, and/or formation of beams using the antenna arrays. Accordingly, for the purposes of this discussion, it should be assumed that the wireless communication link 120 between the aircraft 100 and the first BS 110 may be formed using at least one link established via beamforming. In other words, either the first BS 110 or the aircraft 100, or both, may include radio control circuitry capable of employing beamforming techniques for establishment of the wireless communication link 120.

The first BS 110 has a fixed position geographically and therefore position information regarding the location of the first BS 110 can be known. In some cases, an estimate of the coverage area defining the region in which first BS 110 is capable of providing wireless connectivity to aircraft may also be known or estimable (e.g., at the aircraft 100 and/or at the first BS 110 or another network location). Meanwhile, the position of the aircraft in 3D space may also be known or estimable at any given time (e.g., at the aircraft 100 and/or at the first BS 110 or another network location). Accordingly, flight tracking may be accomplished for UAS/UAV/UAM and other operations via automated airspace management. Furthermore, it should be appreciated that the coverage area of the first BS 110 may possibly be altitude dependent, in some cases. In this regard, for example, the latitudinal and longitudinal coverage area projected onto the surface of the earth for the first BS 110 may be differently sized for different altitudes. Accordingly, for example, based on the known position and coverage characteristics of the first BS 110 and the position information of the aircraft 100 at time $t_0$, it may be determinable that the aircraft 100 is nearing or at the edge of the coverage area of the first BS 110 at time to.

A second BS 130, which may have similar performance and functional characteristics to those of the first BS 110, may be located geographically such that, for the current track or trajectory of the aircraft 100, the second BS 130 is a candidate for handover of the aircraft 100 to maintain a continuous and uninterrupted communication link between the aircraft 100 and ground-based base stations of an ATG wireless communication network at time to. As discussed above, it may be helpful for the second BS 130 to be aware of the approach of the aircraft 100 so that the second BS 130 can employ beamforming techniques to direct a beam toward the aircraft 100 either when or prior to the aircraft 100 reaching the coverage area of the second BS 130. Additionally or alternatively, it may be helpful for the aircraft 100 to be aware of the existence and location of the second BS 130 so that the wireless communication equipment on the aircraft 100 may employ beamforming techniques to direct a beam toward the second BS 130 either when or prior to the aircraft 100 reaching the coverage area of the second BS 130. Thus, at least one of the second BS 130 or the wireless communication equipment on the aircraft 100 may employ beamforming techniques assisted by knowledge of position information to facilitate establishment of the wireless communication link 140 between the wireless communication equipment on the aircraft 100 and the second BS 130. The handover of the aircraft 100 from the first BS 110 to the second BS 130 at time to may be followed by service of the aircraft 100 being provided by the wireless communication link 140 and the second BS 130.

Figure 2:
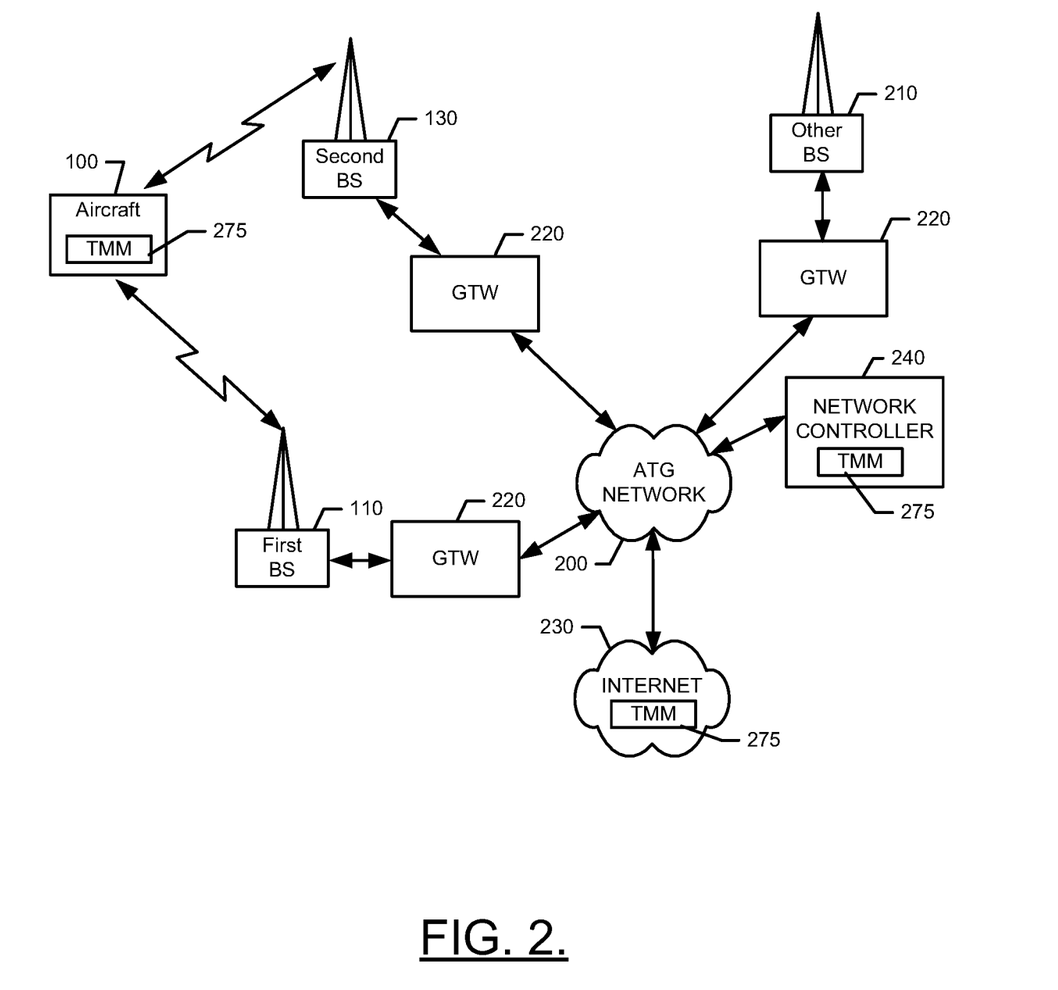
FIG. 2 illustrates a block diagram of a system for employing a trajectory management module that employs proof points data in accordance with an example embodiment.

In accordance with an example embodiment, a beamforming control module may be provided that employs both 2D knowledge of fixed base station location and at least 3D knowledge (perhaps 4D or 5D knowledge in some cases) of position information regarding a receiving station on an aircraft to assist in application of beamforming techniques. The beamforming control module of an example embodiment may be physically located at any of a number of different locations within an ATG communication network. For example, the beamforming control module may be located at the aircraft 100, at either or both of the first and second BS 110 and 130, or at another location in the network or in the cloud. Similarly, a module or tracking engine may also be located at the aircraft 100, at either or both of the first and second BS 110 and 130, or at another location in the network or in the cloud. The module or tracking engine may utilize position information, either independently gathered, or gathered in association with beamforming as described above, to generate and track trajectory information for one or more of the aircraft that are being tracked by the system. Example embodiments may include modules or components that are configured not only to track these trajectories, but to continuously monitor and update possible trajectories associated with one or more of the aircraft so that, for example, optimized routes can be suggested with respect to individually selectable parameters (e.g., time, fuel cost, carbon footprint, contrail generation, turbulence avoidance, etc.). Example embodiments may then further determine (e.g., via utilization of cumulative distribution functions or other probabilistic methods) a degree to which optimized routes are an improvement over other routes and present such information to a viewer (e.g., a pilot, fleet manager or air traffic controller). Thus, example embodiments may provide proof points to demonstrate the comparative value of the solutions generated. FIG. 2 illustrates a functional block diagram of an ATG communication network that may employ an example embodiment of a network that may employ such a device for continuously planning and evaluating trajectory information and augmenting such information with comparative data and context information using a proof points module of an example embodiment.

As shown in FIG. 2, the first BS 110 and second BS 130 may each be base stations of an ATG network 200. The ATG network 200 may further include other BSs 210, and each of the BSs may be in communication with the ATG network 200 via a gateway (GTW) device 220. The ATG network 200 may further be in communication with a wide area network such as the Internet 230 or other communication networks. In some embodiments, the ATG network 200 may include or otherwise be coupled to a packet-switched core network.

In an example embodiment, the ATG network 200 may include a network controller 240 that may include, for example, switching functionality. Thus, for example, the network controller 240 may be configured to handle routing calls to and from the aircraft 100 (or to communication equipment on the aircraft 100) and/or handle other data or communication transfers between the communication equipment on the aircraft 100 and the ATG network 200. In some embodiments, the network controller 240 may function to provide a connection to landline trunks when the communication equipment on the aircraft 100 is involved in a call. In addition, the network controller 240 may be configured for controlling the forwarding of messages and/or data to and from a mobile terminal on the aircraft 100 and may also control the forwarding of messages for the base stations. It should be noted that although the network controller 240 is shown in the system of FIG. 2, the network controller 240 is merely an exemplary network device and example embodiments are not limited to use in a network employing the network controller 240.

The network controller 240 may be coupled to a data network, such as a local area network (LAN), a metropolitan area network (MAN), and/or a wide area network (WAN) (e.g., the Internet 230) and may be directly or indirectly coupled to the data network. In turn, devices such as processing elements (e.g., personal computers, laptop computers, smartphones, server computers or the like) can be coupled to the communication equipment on the aircraft 100 via the Internet 230.

Although not every element of every possible embodiment of the ATG network 200 is shown and described herein, it should be appreciated that the communication equipment on the aircraft 100 may be coupled to one or more of any of a number of different networks through the ATG network 200. In this regard, the network(s) can be capable of supporting communication in accordance with any one or more of a number of first-generation (1G), second-generation (2G), third-generation (3G), fourth-generation (4G), fifth generation (5G) and/or future mobile communication protocols or the like. In some cases, the communication supported may employ communication links defined using unlicensed band frequencies such as 2.4 GHz or 5.8 GHz. However, communications may be supported by other frequencies in licensed bands additionally or alternatively. Moreover, it may be possible to switch between licensed and unlicensed band communications (and/or satellite communications) under the control of the network controller 240 in some cases. Additionally, in some cases, the ATG network 200 may be augmented by or operate in parallel with an air-to-air or satellite communication system and switching may be performed to handle communications alternately between either the ATG network 200, the air-to-air system or the satellite communications system in some cases under the control of the network controller 240.

As indicated above, a trajectory management (e.g., Flight 5D application) module may be employed on electronic equipment at either or both of the network side or the aircraft side in example embodiments. Thus, in some embodiments, the trajectory management module may be implemented in a receiving station on the aircraft (e.g., a passenger device or device associated with the aircraft's communication system). In some embodiments, the trajectory management module may be implemented in the network controller 240 or at some other network side entity. Moreover, in some cases, the trajectory management module may be implemented at an entity located in the cloud (e.g., at a location that is operably coupled to the ATG network 200 via the Internet 230). Accordingly, FIG. 2 illustrates a trajectory management module or component (TMM) 275 at each of the aircraft 100, the network controller 240, and the Internet 230. However, it should be appreciated that example embodiments could include only one such component (at any one of the locations). Alternatively, the system could operate in a distributed fashion with multiple TMM 275 at any (or each) of the locations shown. Additionally, it should be appreciated that an instance of the TMM 275 may be (in some cases) located on each aircraft that is configured to communicate with the ATG network 200.

Figure 3:
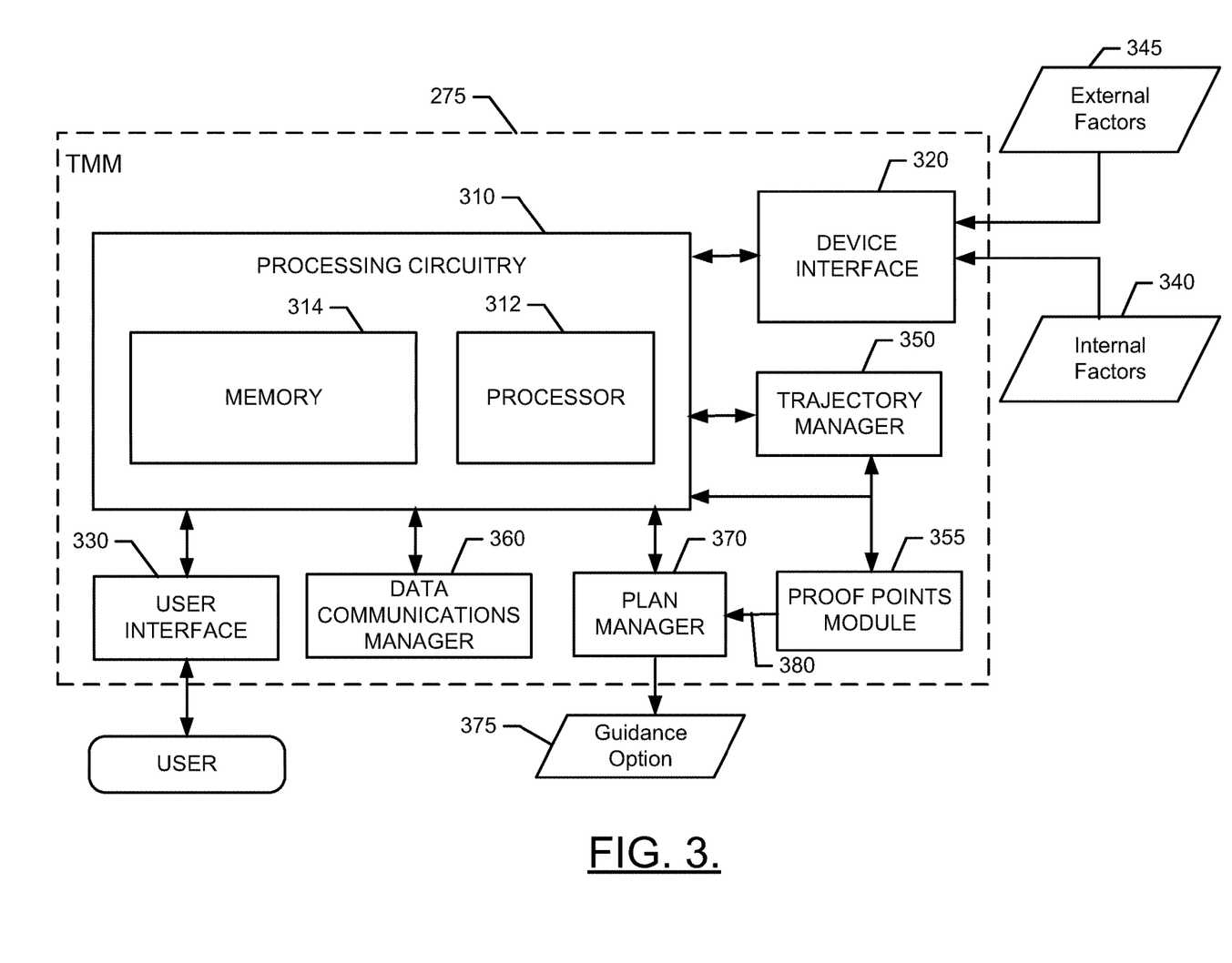
FIG. 3 illustrates the trajectory management module according to an example embodiment.

FIG. 3 illustrates the architecture of TMM 275 in accordance with an example embodiment. The TMM 275 may include processing circuitry 310 configured to receive information indicative of internal and external factors for processing as described herein. The processing circuitry 310 may be configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer, or other device on the aircraft 100, or a device at any portion of the ATG network 200. In some embodiments, the processing circuitry 310 may communicate with various components, entities and/or sensors of the ATG network 200 to receive the external factors.

The user interface 330 (if implemented) may be in communication with the processing circuitry 310 to receive an indication of a user input at the user interface 330 and/or to provide an audible, visual, mechanical or other output to the user. As such, the user interface 330 may include, for example, a display (e.g., a touchscreen or other display), a keyboard, a mouse, speakers, one or more levers, switches, indicator lights, buttons or keys (e.g., function buttons), and/or other input/output mechanisms capable of delivering audible, visual, haptic or other outputs.

The device interface 320 may include one or more interface mechanisms for enabling communication with other devices (e.g., modules, entities, sensors and/or other components of the ATG network 200 or on the aircraft 100 itself when the TMM 275 is instantiated on the aircraft 100). In some cases, the device interface 320 may be any means such as a device or circuitry embodied in either hardware, or a combination of hardware and software that is configured to receive and/or transmit data from/to modules, entities, sensors and/or other components of the ATG network 200 that are in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like.

In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the TMM 275 based on inputs received by the processing circuitry 310 including information associated with the internal factors 340 and/or external factors 345. External factors 345 may include, for example, data and information relevant to the airspace and environment within which an aircraft operates. Internal factors 340 may include, for example, pilot or fleet manager objectives and preferences related to aircraft operations. Additional internal factors include current and future aircraft weight, speed, configuration of landing gear and controls, and effects on performance of abnormal conditions such as failure of an engine or other aircraft system such as cabin environmental, hydraulics, electrical, communications systems, or other factor affecting otherwise normal flight operations. Thus, for example, the external factors 345 may include airspace exclusions, architectures and procedures, winds and temperatures aloft, storms, icing, volcanic ash, turbulence, and other air traffic, including air traffic management flow control initiatives for congestion management. Internal factors 340 may further include pilot or operator policies and preferences for desired time of arrival, avoidance of turbulence or icing or other flight hazards, fuel burn minimization, and cost minimization, pilot skill level (e.g., based on flight hours, currency, and/or ratings).

As such, in some embodiments, the processor 312 (or the processing circuitry 310) may be said to cause each of the operations described in connection with the TMM 275 (and/or the components or modules thereof) including operations in relation to processing the internal and/or external factors 340 and 345 to undertake the corresponding functionalities relating to providing continuous replanning of dynamically interacting trajectories to generate a guidance output (e.g., a pilot advisory recommendation regarding path optimization options) responsive to execution of instructions or algorithms configuring the processor 312 (or processing circuitry 310) accordingly. The TMCC 275 may also manage the provision of "proof points" associated with the trajectories calculated and any guidance output.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally, or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the TMM 275 as described herein.

In an example embodiment, the memory 314 may store the internal factors 340 and may also store (temporarily or permanently) external factors 345 including dynamic parameters that are provided continually or periodically as updates. The processing circuitry 310 may be configured to process all materials received (e.g., at a mobile communication station (which should be appreciated to be capable of transmission and reception of signaling in connection with two-way communication)). The mobile communication station may be a wireless communication device onboard the aircraft 100, or may be a wireless communication device of the aircraft 100 itself. The wireless communication device of the aircraft 100 may transfer information to and from passenger devices (with or without intermediate storage), or may transfer information to and from other aircraft communications equipment (with or without intermediate storage).

The TMM 275 may be implemented in a system that comprises additional modules that may each include their own respective processing circuitry components, or that may operate under the control of the processing circuitry 310. The modules of or in communication with the TMM 275 may include components that operate in connection with or as parts of the device interface 320 and/or the user interface 330.

In an example embodiment, the TMM 275 may include or otherwise be in communication with a trajectory manager 350. The trajectory manager 350 may be embodied as a computational engine for flight path (trajectory) management. An example of a suitable computational engine capable of continuous re-planning of five-dimensional trajectories, is disclosed in commonly assigned U.S. Pat. No. 8,594,917, entitled "Method And Apparatus For Dynamic Aircraft Trajectory Management" and U.S. Pat. No. 8,554,458, entitled "System and Method for Planning, Disruption Management, and Optimization of Networked, Scheduled or On-Demand Air Transport Fleet Trajectory Operations," the contents of each of which are hereby incorporated by reference in their entireties. The trajectory manager 350 may include or otherwise be operably coupled to a proof points module 355 as described in greater detail below.

The proof points module 355 may be configured to perform path comparisons between different paths associated with an aircraft (e.g., aircraft 100) and generate comparative data and/or context information based on the comparisons. These comparisons may be across one or multiple parameters so that, for example, route optimizations can be determined on the basis of specific, selectable (by the pilot or other operators) parameters or combinations thereof. Thus, although the trajectory manager 350 can work with the plan manager 370 to define optimized routes generally, the integration of the proof points module 355 can enable route optimization across multiple different selectable parameters and further enable balancing of the optimization efforts across parameters, while providing graphical evidence to the operator regarding the comparative benefits of the options being compared. As such, the proof points module 355 may be configured to determine and provide information regarding suggested or possible routes, and the comparative value of each route relative to a selected parameter (e.g., time, fuel cost, carbon footprint, contrail generation, turbulence avoidance, etc.). In some cases, the proof points module 355 may be configured to plot a cumulative distribution function and/or plot probability based comparisons of one or more trajectories. Example embodiments may then further determine (e.g., via utilization of cumulative distribution functions or other probabilistic methods) a degree to which optimized routes are an improvement over other routes and present such information to a viewer (e.g., a pilot, fleet manager or air traffic controller). Thus, example embodiments may provide proof points to demonstrate the comparative value of the solutions generated (e.g., by the trajectory manager 350) relative to other solutions and/or historical data. In some cases, data associated with flights previously flown and/or currently in flight may be utilized by the proof points module 355 to serve as a basis for generating the probabilistically based calculations associated routes being evaluated. As such, any given route can be understood in relation to a historical context of aircraft performance models and actual data accumulated over time. In particular, data associated with a plurality of flights and routes flown previously and currently may be utilized by the proof points module 355 to calculate (and graphically demonstrate through plan manager 370) the cost improvements associated with an optimized route generated by the trajectory manager 350. This methodology will be further described below in reference to FIGS. 4 and 5.

The TMM 275 may also include or be in communication with a data communication manager 360. The data communications manager 360 may be embodied as a data communications facility capable of integration with the computational engine of the trajectory manager 350 for flight path (trajectory) management, while also managing real-time ATG network communications (or other communications to the aircraft 100) that provide real-time data that relates to one or both of the internal and external factors 340 and 345. As such, the data communications manager 360 may be embodied as a communications device capable of accessing and ingesting the information required for the computations in fast-time (i.e., future time).

In an example embodiment, the TMM 275 may also include or be in communication with a plan manager 370. The plan manager 370 may be embodied as a graphics engine configured to generate a graphical depiction of a guidance option 375 in the form of a plan or option for the flight path (that may be provided to the user via the user interface 330). The guidance option (or plan) may be provided in four dimensions (e.g., latitude, longitude, elevation, and time) to the pilot of the aircraft 100 to provide intuitive insights into advisory information provided by the TMM 275, for pilot decision-making.

Figure 4:
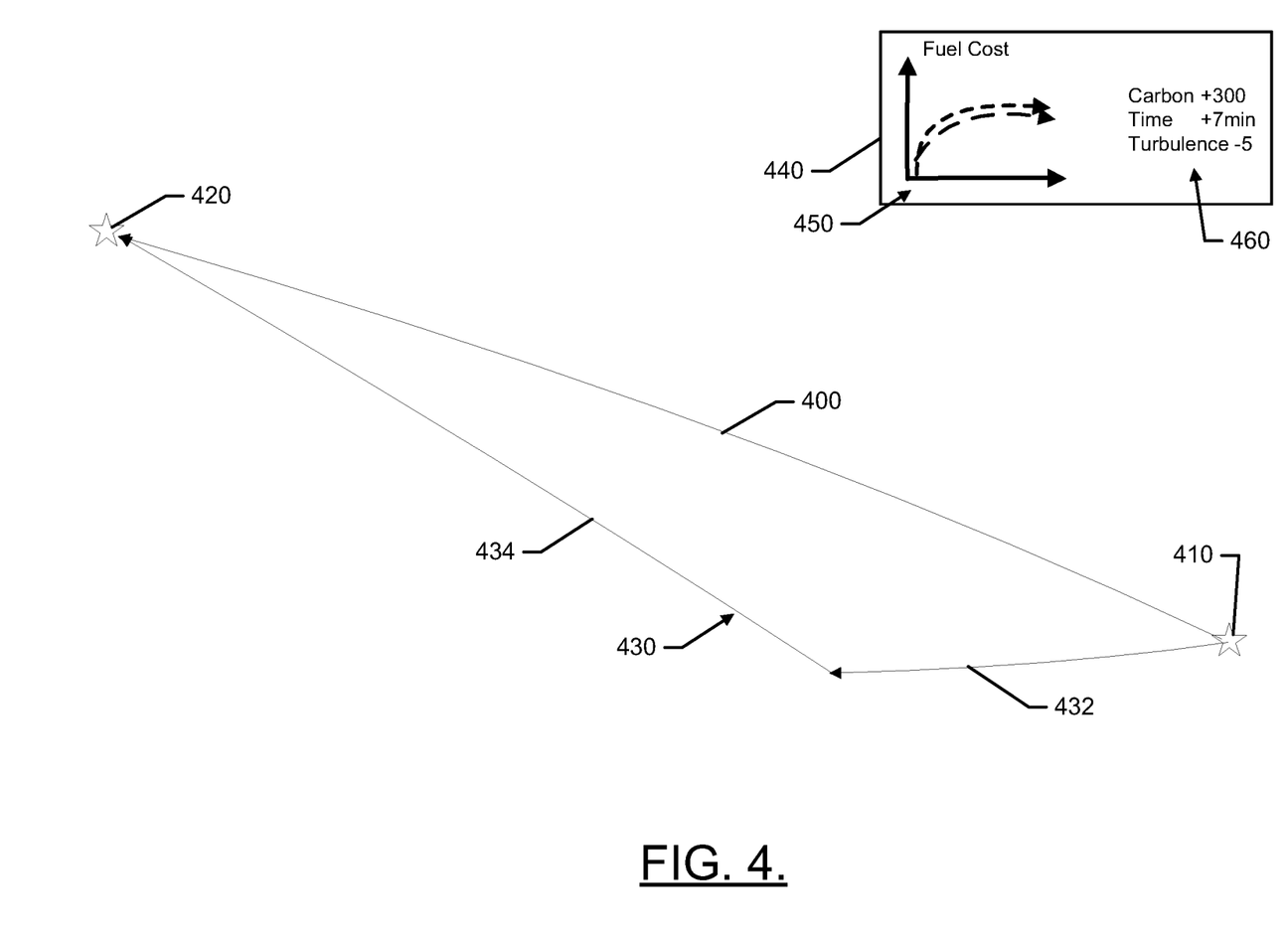
FIG. 4 illustrates operation of the trajectory management module to provide advisory services with proof points data in accordance with an example embodiment.

In an example embodiment, the plan manager 370 may interface with the proof points module 355 to generate graphical and textual presentations of solution diagnostics and comparative benefits of various flight plan options to augment the guidance option 375 with proof points data 380 from the proof points module 355. The proof points data 380 may demonstrate comparative data and context information associated with a route being evaluated and another route (or historical collection of routes). Thus, for example, as shown in FIG. 4, a first flight path 400 may initially be calculated from a first point 410 to a second point 420. Of note, the first point 410 and/or the second point 420 may be points of origin and destination, respectively. However, either or both could alternatively be waypoints of a larger flight path. Moreover, the first point 410 could be the current position of the aircraft 100, or a future position from which action may thereafter be taken to adjust a flight path of the aircraft 100.

FIG. 4 also shows a second flight path 430, which includes a first segment 432 and a second segment 434. Each of the first flight path 400 and the second flight path 430 may be associated with data recorded for a number of previously flown trajectories either via actual data or modeled data that is generated based on actual data. Of note, there may be a plurality of other potential trajectories or routes between the first point 410 and the second point 420. However, consideration of the first and second flight paths 400 and 430 between the first and second points 410 and 420 is discussed herein by way of example that may be applicable by extension to these other potential trajectories.

The proof points module 355 may be configured to compare the first flight path 400 to the second flight path 430 (and any other flight paths) in terms of any of time, fuel, distance, cost, contrail generation, carbon footprint and/or other parameters (e.g., cost parameters) of pilot and/or fleet manager/air traffic controller preference. The proof points module 355 may then be configured to generate the proof points data 380 described above. The proof points data 380 may include a parameter-specific path comparison (e.g., via the user interface 330) to illustrate the comparison selected by the user. The proof points data 380 may also provide path diagnostic information in graphical or textual form to the pilot, explaining the rationale behind updated path advisories in a comparative way to demonstrate the degree of improvement relative to the selected parameter over other options (or another route being evaluated).

As discussed above, the TMM 275 may be configured to generate optimized solutions for the external factors 345 and the internal factors 340 that are provided including, at least in part, data that is received on or from the aircraft 100 via real-time wireless communications (e.g., via the ATG network 200). The internal and external factors 340 and 345 may therefore include dynamic and/or fixed parameters of various types, and the parameters may constrain the optimization of solutions. The dynamic parameters may include atmospheric parameters, airspace parameters, and aircraft parameters. At least some of these dynamic parameters may be communicated in real time (e.g., via the ATG network 200) either to or from the aircraft 100 for use at the TMM 275 (regardless of where the TMM 275 is located). The TMM 275 may further augment the optimized solutions by providing comparative data (e.g., proof points data 380 indicating the cost improvement of a recommended route with respect to a particular parameter over another route or routes) for evaluation by the user. The TMM 275 may further provide context information (e.g., indicating impacts on other parameters) for the route so that the degree of impact across multiple parameters can be evaluated and balanced.

Some examples of atmospheric parameters that may constrain optimization solutions includes the following data for current and forecast conditions (among others that may be developed by weather information service providers in the future):

- Current Weather (Depictions, Freezing Levels, Precipitation, etc.)
- Winds Aloft (including Jet Stream, etc.)
- Surface Winds
- Temperatures Aloft
- Temperature-Dew Point data
- Visibilities (including runway visual ranges (RVRs), etc.)
- Ceiling
- Sky Coverage
- Radar Images (Composite and Tilt-specific, including gridded weather products)
- Satellite Cloud Cover
- Color Infrared (IR) Cloud Cover
- Echo Tops, etc.
- Volcanic Ash
- Adverse Weather Conditions (AIRMETs, SIGMETs, etc.)
- Thunderstorm and Severe Weather Forecast
- Uncrewed Aerial Systems (UAS) Operating Areas and activity
- Icing
- Turbulence
- Pilot Reports (PiReps, including electronic or ePiReps)
- Meteorological Terminal Aviation Routine (METAR) weather reports
- Terminal Aerodrome Forecasts (TAFs)
- Model Output Systems (MOS) forecasts and variants thereof
- Center Weather Advisories.

The National Airspace System (NAS) parameters (or simply, airspace parameters) that may constrain flight path optimization solutions include the following information for current and forecast traffic conditions:

- Temporary Flight Restrictions (TFRs)
- Special Use Airspace (MOAs, Restricted Areas, Firing Areas, etc.)
- Air Traffic Control Traffic Management Initiatives (TMIs)
- Notices to Airmen (NOTAMs)
- Airport Configuration Changes
- ATC Preferred Routing
- ATC Approved Routing
- Ground Delay Programs
- Time-Based Flow Management
- Airspace Flow Programs
- Ground Stops
- Coded Departure Routes
- And others.

The aircraft parameters required to be incorporated in the flight path optimization process include the following:

- Current and forecast aircraft weight (based on fuel and oil consumption measurement or modeling)
- Aircraft configuration (flaps and landing gear positions, for example)
- Aircraft Center of Gravity, current and forecast (for trim drag computation)
- Aircraft-based measurement of atmospheric conditions affecting aircraft performance calculations
- Pilot or dispatcher preferences and policies for each of the following flight path objectives:
  - Minimum path length.
  - Minimum path time
  - Required time of arrival
  - Minimum path fuel
  - Minimum path cost
  - Tradeoff costs between path cost for engine reserves versus for fuel consumption
  - Minimum path turbulence
  - Minimum path icing
  - Maximum allowable crosswind and tailwind for takeoff and landing
  - Minimum runway length requirements
  - Maximum fuel cost (for refueling stop optimization)
  - And others
- Aircraft-based constraints on flight path options during the optimization process, including a complete digital representation of the current flight trajectory (for example as defined in the RTCA SC214 protocol or newer protocols to be developed for Trajectory-Based Operations (TBO) airspace.)
- And others.

Accordingly, for example, the TMM 275 may be configured to consider internal factors and external factors related to route optimization in light of at least some dynamic parameters that are communicated in real time to and/or from the aircraft 100 while in-flight (e.g., over a robust, low-latency, high-bandwidth) wireless communication link with the aircraft 100 (e.g., via the ATG network 200). Then the TMM 275 may provide comparative data and/or context information to demonstrate the value or degree of improvement of one route over another relative to one selectable parameter, or across multiple parameters. Thus, the TMM 275 considers deconfliction of multiple aircraft trajectories (e.g., via the trajectory manager 350), but also receives real time dynamic updates (e.g., via the data communications manager 360) to conditions that may affect the flight path of the aircraft 100. Based on the dynamic parameters, the plan manager 370 may consider all factors that may impact flight path optimization (e.g., relative to internal factors set by the pilot or an operator, and external factors that may be dynamically changing) to output the guidance option 375 graphically. The proof points module 355 may then provide (again graphically) a visual comparison of the routes relative to specific selectable parameters to the pilot or operator (e.g., also with or as part of the guidance option 375) with or without context information that further facilitates decision making by the pilot, air traffic controller or fleet manager.

Figure 5:
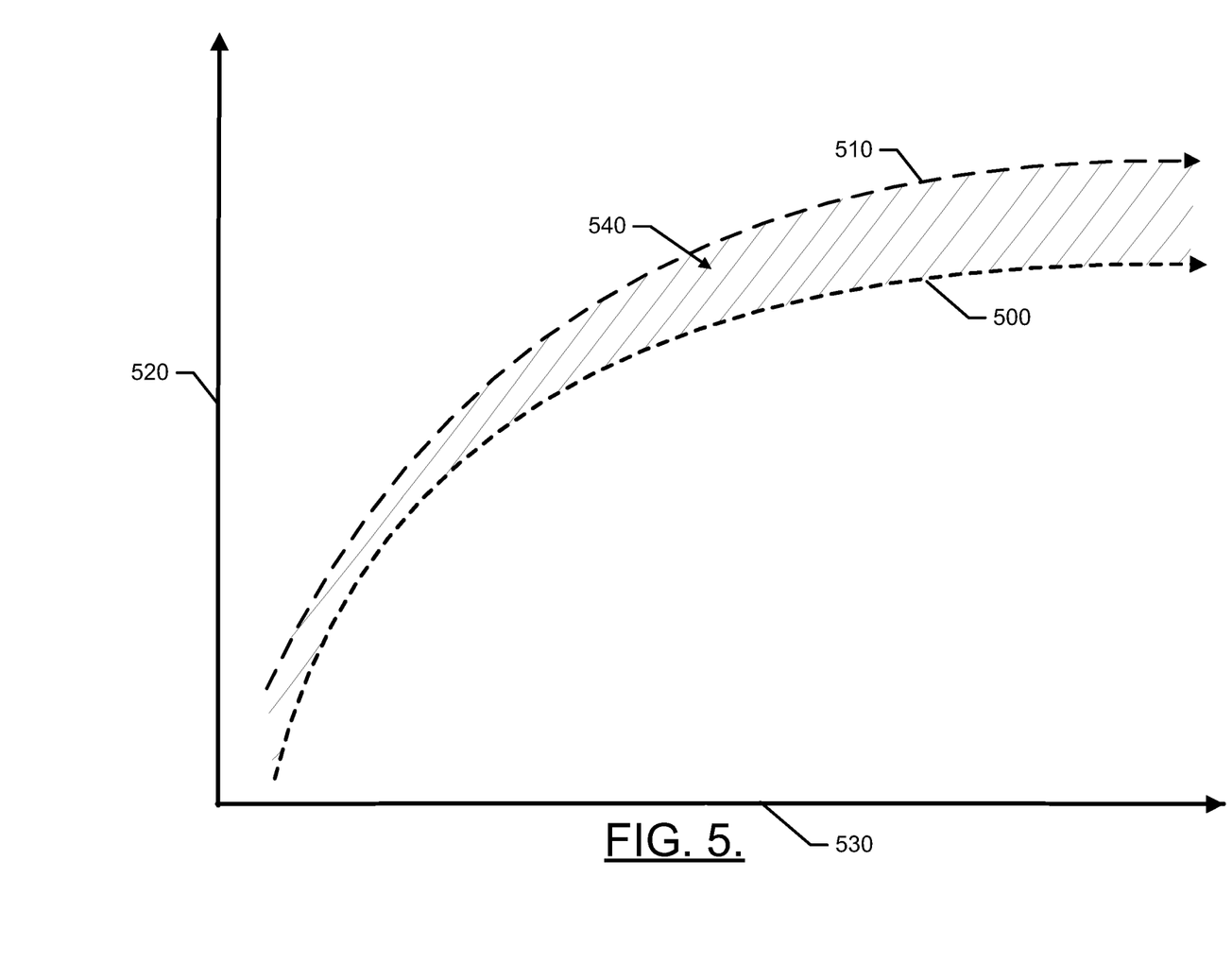
FIG. 5 illustrates an example of comparative data that may be used to augment trajectory management services as proof points data in accordance with an example embodiment.

FIG. 4 shows a proof point data display box 440 that includes comparison data 450 and context information 460. However, it should be appreciate that some embodiments could only provide one or the other of the comparison data 450 and context information 460 instead of both. The comparison data 450 of this example includes a visual and graphical comparison in the form of a graph that helps demonstrate the degree of improvement of one route relative to another. (i.e., comparing the first route 400 to the second route 430), FIG. 5 shows a more detailed view of the comparison data 450 of FIG. 4 in accordance with an example embodiment. In this regard, the comparison data 450 may include a first curve 500 showing a cumulative distribution function associated with the first route 400 and a second curve 510 showing a cumulative distribution function associated with the second route 430. The cumulative distribution functions are plotted on a first axis 520, which correlates to a user selectable parameter in this example, and a second axis 530. The user selectable parameter may be, for example, fuel, time, cost, carbon emission, contrail generation, or various other cost parameters. The second axis 530 of this example may correlate to a percentage of number of modeled or actual flights for which data corresponding to the route associated with the respective curve is available. Thus, the comparison data may effectively define a plot of likely costs associated with a route in a probabilistic way. An area between the curves 540 may therefore represent a cost savings associated with selecting (in this example) the second route 430 instead of the first route 400.

Referring again to FIG. 4, although the second route 430 appears to provide some fuel cost savings (presumably due to burning less fuel that the first route 400), selection of the second route 430 may have other "costs" relative to other parameters. Thus, the context information 460 may be provided to give the user context for cross-parameter impacts of making a decision between routes. In this example it can be seen that the context information 460 informs the user that the new route (i.e., second route 430) may, in addition to the fuel cost savings associated with selecting the second route 430, impact some other parameters such as carbon output, time and turbulence encountered. In this example, the time cost will be higher, and the carbon output will also be higher. However, less turbulence can be expected on the second route 430. Thus, the proof point data display box 440 can provide comparison data to compare the current route to another route to provide the ability to perform a value judgement on the basis of the particular parameter used in the comparison. However, the proof point data display box 440 can also (or alternatively) provide context information so that impacts on other parameters can also be appreciated such that, for example, if the improvement relative to one parameter is offset by additional costs to other parameters, the pilot can make an informed routing decision on multiple factors without cycling through multiple individual calculations and corresponding display generation cycles. All information can be appreciated from one display source.

It should also be appreciated that since the area between the curves 540 of FIG. 5 is indicative of cost savings between two routes, the adoption of the better route can provide a better (i.e., less costly) route in terms of one or multiple parameters, and the cost can be quantified. In an example embodiment, the proof points module 355 may be further configured to generate a service charge based on the savings achieved by adoption of suggested routes. For example, the proof points module 355 may be configured to determine cost savings and apply a fixed percentage to the cost savings as the service charge.

Example embodiments may therefore be understood to integrate a real-time (or future time) trajectory manager with the data communication system that enables a flight path to be continuously (or periodically) optimized and updated, while also being augmented with comparative data and context information. As such, advisory information can be provided to the pilot, based on ever-changing current and forecast conditions for the atmosphere, the airspace and the aircraft 100, from wherever the aircraft 100 is at each moment, to the destination, based on preferences and priorities set by the aircraft operator.

The TMM 275, interdependently supported by a high bi-directional bandwidth, low latency connectivity system, provides the first capability for pilots to gain access to advisory information on flight path management and optimization in the context of continuously changing conditions, and user policies and preferences. The TMM 275 is generally founded on the concept of continuous re-planning of dynamically interacting flight paths (trajectories) to provide pilot advisories that, for the first time, enable trajectory selection to be made by pilots based on preferences, economics and safety with comparative data and context information that validates the value of the optimizations presented. The TMM 275 is configured to ingest data about observations and forecasts of atmospheric conditions, airspace status, and traffic, through data communications technology, to make the computations of future flight paths that satisfy user preferences, trajectory economics, and safety that are accompanied with "proof" of the value added.

The capability described herein may be of significant value for improving safety and efficiency for current operations of commercial, business, general aviation and uncrewed aerial systems (UAS) aircraft operations worldwide. The capability may also be of significant value in future envisioned "Urban and Regional Air Mobility (CRAM) electric eVTOL (Vertical Takeoff and Landing)" and "Thin Haul electric eCTOL (Conventional Takeoff and Landing" air taxi operating concepts, for enabling these high-density traffic systems to operate with safety and efficiency. The capability may also create advanced utility to the operations of Flight Operational Quality Assurance (FOQA) systems by providing a high-quality, high-fidelity baseline flight path for comparative analysis for pilot-flown paths.

In some embodiments, the TMM 275 may be disposed at the aircraft 100. However, the TMM 275 may be disposed at the network controller 240, any ground station, locations in the cloud, or any other location that may be in communication with the base stations and/or aircraft of the ATG network 200. In some example embodiments, the TMM 275 may further be configured to operate in a mobile mesh network context. For example, the TMM 275 may be configured to utilize dynamic position information associated with multiple aircraft in order to form mesh communication links between aircraft. Thus, for example, one or multiple aircraft (in a packet-based system) could relay information to another aircraft from a terrestrial base station. In such an example, the dynamic parameters may be provided to and/or from multiple in-flight aircraft. In some embodiments, multiple "hops" between aircraft may be accomplished to reach remotely located aircraft, or even to provide self-healing in a network where a particular ground station is not operating, but there are other aircraft in the area that can relay information to fill in the coverage gaps left by the non-operating ground station.

The system of FIG. 2 may therefore include one or more TMMs 275 at one or more corresponding locations within the system. Regardless of the number and locations of such modules, the information associated therewith may be used to generate guidance options 375 and/or proof point data 380 that can be provided, for example, to an operator and/or a pilot at either end of a two-way communication link. Example embodiments may therefore provide highly capable, in-flight advisory services that consider dynamic parameters and the desires or business imperatives of a pilot or operator. Proactive resource management, safety related advisory services, and other activities may then be undertaken to improve system performance and customer satisfaction.

Figure 6:
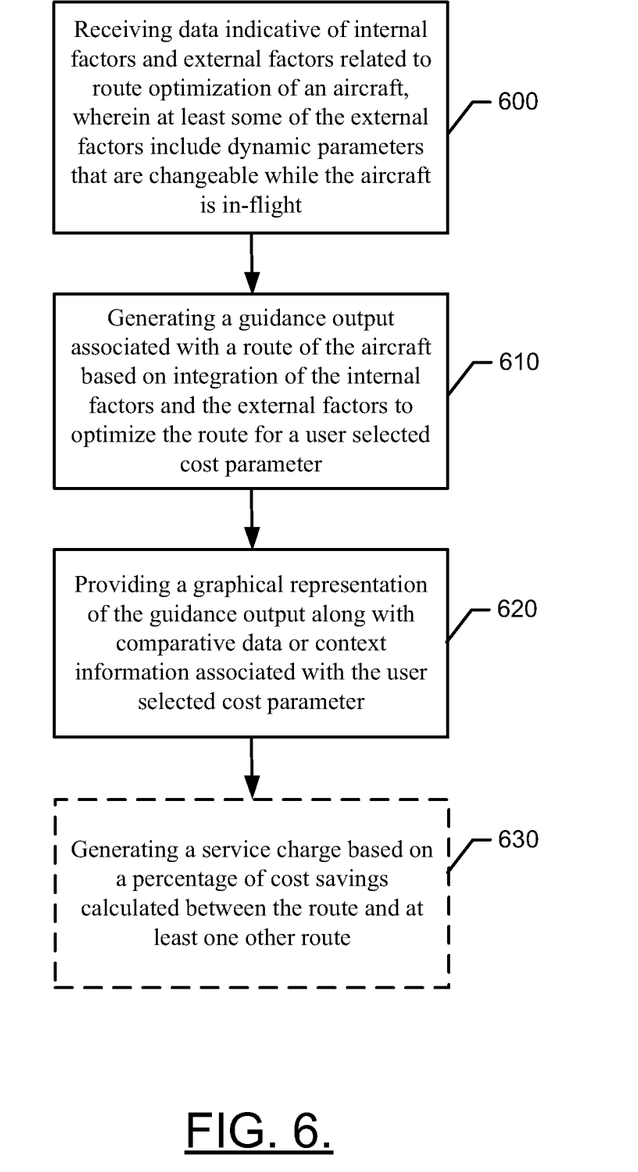
FIG. 6 illustrates a block diagram of a method for performing an example advisory related function with proof points data in accordance with an example embodiment.

As such, the system of FIG. 2 may provide an environment in which the trajectory management module of FIG. 3 may provide a mechanism via which a number of useful methods may be practiced. FIG. 6 illustrates a block diagram of one method that may be associated with the system of FIG. 2 and the modules of FIG. 3. From a technical perspective, the TMM 275 described above may be used to support some or all of the operations described in FIG. 6. As such, the platform described in FIG. 2 may be used to facilitate the implementation of several computer program and/or network communication-based interactions. As an example, FIG. 6 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the TMM 275, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s).

These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 6, may include receiving data indicative of internal factors and external factors related to route optimization of an aircraft at operation 600. At least some of the external factors may include dynamic parameters that are changeable while the aircraft is in-flight. The method may further include generating a guidance output associated with a route of the aircraft based on integration of the internal factors and the external factors to optimize the route for a user-selected cost parameter at operation 610. The method may further include providing a graphical representation of the guidance output along with comparative data or context information associated with the user-selected cost parameter at operation 620.

The method described above in reference to FIG. 6 may include additional steps, modifications, augmentations and/or the like to achieve further objectives or enhance operation of the system. The additional steps, modifications, augmentations and/or the like may be added in any combination with each other. For example, in some cases, the method may include an optional additional operation 630, which may include generating a service charge based on a percentage of cost savings calculated between the route and at least one other route. In an example embodiment, the comparative data may include a graph showing a comparison of the route with at least one other route to demonstrate a value difference for the user-selected cost parameter between the route and the at least one other route. In some cases, the graph may be a cumulative distribution function plotting the user-selected cost parameter against a percentage of a number of flights. In some examples, the internal factors may include pilot or operator policies or preferences. In an example embodiment, the preferences may define a preferred time of arrival, preferred hazard avoidance strategy, preferred cost management strategy, and preferred fuel management strategy. In some cases, the user-selected cost parameter may include fuel consumption, time consumption, contrail generation, or carbon footprint. In an example embodiment the context information may include information indicative of an impact of following the route on a cost parameter other than the user-selected cost parameter. In some cases, providing the graphical representation of the guidance output further may include providing both the comparative data and the context information associated with the user-selected cost parameter. In some examples, the module may be disposed on the aircraft or at a ground station. In an example embodiment, the wireless communication network may be an ATG network, and the module may be disposed at a remote location relative to the aircraft and ground stations within the ATG network.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An aviation advisory module comprising processing circuitry configured to:
receive data indicative of internal factors and external factors related to route optimization of an aircraft, the internal factors including pilot or operator preferences that define a preferred time of arrival, preferred hazard avoidance strategy, preferred cost management strategy and preferred fuel management strategy, wherein at least some of the external factors include dynamic parameters that are changeable while the aircraft is in-flight including airspace exclusions, architectures and procedures, winds and temperatures aloft, storms, icing, volcanic ash, turbulence, other air traffic and aircraft management flow control initiatives for congestion management;
generate a guidance output associated with a route of the aircraft based on integration of the internal factors and the external factors to optimize the route for a user-selected cost parameter, wherein the user-selected cost parameter comprises fuel consumption, time consumption, contrail generation or carbon footprint; and
provide a graphical representation of the guidance output showing both the route and a comparison route along with a display box including both comparative data and context information associated with the user-selected cost parameter, wherein the context information comprises information indicative of an impact of following the route, instead of the comparison route, on a cost parameter other than the user-selected cost parameter.

2. The module of claim 1, wherein the comparative data comprises a graph showing a comparison of the route with the comparison route to demonstrate a value difference for the user-selected cost parameter between the route and the comparison route.

3. The module of claim 2, wherein the graph is a cumulative distribution function plotting the user-selected cost parameter against a percentage of a number of flights.

4. The module of claim 1, wherein providing the graphical representation of the guidance output further includes both the comparative data and the context information associated with the user-selected cost parameter.

5. The module of claim 4, wherein a service charge associated with providing the comparative data and the context information is calculated based on a percentage of cost savings calculated between the route and at least one other route.

6. The module of claim 1, wherein the module is disposed on the aircraft.

7. The module of claim 1, wherein the module is disposed at a ground station.

8. The module of claim 1, wherein the wireless communication network comprises an air-to-ground (ATG) network.

9. The module of claim 8, wherein the module is disposed at a remote location relative to the aircraft and ground stations within the ATG network.

10. A method comprising:
receiving data indicative of internal factors and external factors related to route optimization of an aircraft, the internal factors including pilot or operator preferences that define a preferred time of arrival, preferred hazard avoidance strategy, preferred cost management strategy and preferred fuel management strategy, wherein at least some of the external factors include dynamic parameters that are changeable while the aircraft is in-flight including airspace exclusions, architectures and procedures, winds and temperatures aloft, storms, icing, volcanic ash, turbulence, other air traffic and aircraft management flow control initiatives for congestion management;
generating a guidance output associated with a route of the aircraft based on integration of the internal factors and the external factors to optimize the route for a user-selected cost parameter, wherein the user-selected cost parameter comprises fuel consumption, time consumption, contrail generation or carbon footprint; and
providing a graphical representation of the guidance output showing both the route and a comparison route along with a display box including both comparative data and context information associated with the user-selected cost parameter, wherein the context information comprises information indicative of an impact of following the route, instead of the comparison route, on a cost parameter other than the user-selected cost parameter.

11. The method of claim 10, wherein the comparative data comprises a graph showing a comparison of the route with the comparison route to demonstrate a value difference for the user-selected cost parameter between the route and the comparison route.

12. The method of claim 10, wherein the graph is a cumulative distribution function plotting the user-selected cost parameter against a statistical percentage of a number of flights.

13. The method of claim 10, wherein providing the graphical representation of the guidance output further includes both the comparative data and the context information associated with the user-selected cost parameter.

14. The method of claim 13, further comprising generating a service charge based on a percentage of cost savings calculated between the route and at least one other route.

15. The method of claim 13, wherein providing the graphical representation comprises providing the comparative data and the context information from a module located on the aircraft, on a ground station, or at a remote location within an air-to-ground (ATG) network.

* * * * *